(12) United States Patent
Arndt et al.

(10) Patent No.: US 11,052,578 B2
(45) Date of Patent: Jul. 6, 2021

(54) METHOD FOR PRODUCING A THERMOPLASTIC COMBINATION FILM

(71) Applicant: SAINT-GOBAIN GLASS FRANCE, Courbevoie (FR)

(72) Inventors: Martin Arndt, Aachen (DE); Michele Cappuccilli, Aachen (DE); Wolfgang Von Avenarius, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 164 days.

(21) Appl. No.: 16/495,014

(22) PCT Filed: Apr. 18, 2018

(86) PCT No.: PCT/EP2018/059805
§ 371 (c)(1),
(2) Date: Sep. 17, 2019

(87) PCT Pub. No.: WO2018/206245
PCT Pub. Date: Nov. 15, 2018

(65) Prior Publication Data
US 2020/0269472 A1    Aug. 27, 2020

(30) Foreign Application Priority Data
May 11, 2017    (EP) .................................. 17170606

(51) Int. Cl.
*B29C 41/00* (2006.01)
*B29C 65/00* (2006.01)
(Continued)

(52) U.S. Cl.
CPC .............. *B29C 41/02* (2013.01); *B29C 65/08* (2013.01); *B29C 65/16* (2013.01); *B29C 65/48* (2013.01); *B29K 2101/12* (2013.01); *B29L 2031/34* (2013.01); *B29L 2031/3475* (2013.01)

(58) Field of Classification Search
CPC ......... B29C 41/00; B29C 41/02; B29C 65/00; B29C 65/08; B29C 65/10; B29C 65/16; B29C 65/40; B29C 65/48
See application file for complete search history.

(56) References Cited

U.S. PATENT DOCUMENTS 5,013,134 A    5/1991    Smith
6,636,370 B2 *  10/2003    Freeman ................... B32B 3/02
                                                                    359/894
(Continued)

FOREIGN PATENT DOCUMENTS

DE    195 35 053 A1    4/1996
DE    196 11 483 A1    10/1997
(Continued)

OTHER PUBLICATIONS

International Search Report as issued in International Patent Application No. PCT/EP2018/059805, dated Jun. 27, 2018.

*Primary Examiner* — Jacob T Minskey
*Assistant Examiner* — Matthew Hoover
(74) *Attorney, Agent, or Firm* — Pillsbury Winthrop Shaw Pittman LLP

(57) ABSTRACT

A method for producing a thermoplastic combination film suitable for a composite glass pane, wherein the thermoplastic combination film includes at least one defined area, which is provided for a camera window or an HUD (head-up display) region that has a variable wedge angle, the method including providing a first thermoplastic film, producing a second thermoplastic film with a variable wedge angle, wherein the three-dimensional shape of second thermoplastic film is obtained by molding on a mold, and joining together the first thermoplastic film and the second thermoplastic film.

9 Claims, 4 Drawing Sheets

(51) Int. Cl.
*B29C 41/02* (2006.01)
*B29C 65/08* (2006.01)
*B29C 65/16* (2006.01)
*B29C 65/48* (2006.01)
*B29K 101/12* (2006.01)
*B29L 31/34* (2006.01)

(56) References Cited

U.S. PATENT DOCUMENTS

| | | | |
|---|---|---|---|
| 6,881,472 B2 | 4/2005 | Freeman | |
| 7,060,343 B2 | 6/2006 | Freeman | |
| 8,451,541 B2 | 5/2013 | Labrot et al. | |
| 2007/0009714 A1* | 1/2007 | Lee | B32B 17/10568 428/172 |
| 2010/0086744 A1 | 4/2010 | Stenzel et al. | |
| 2016/0168353 A1 | 6/2016 | Spangler et al. | |
| 2016/0291324 A1* | 10/2016 | Arndt | B32B 17/10036 |

FOREIGN PATENT DOCUMENTS

| | | |
|---|---|---|
| EP | 1 063 205 B1 | 12/2000 |
| EP | 1 593 656 A1 | 11/2005 |
| EP | 2 883 693 A1 | 6/2015 |
| EP | 3 118 036 A1 | 1/2017 |
| JP | H11-130481 A | 5/1999 |
| JP | 2000-187181 A | 7/2000 |
| JP | 2007-223883 A | 9/2007 |
| JP | 2009-035444 A | 2/2009 |
| JP | 2010-525971 A | 7/2010 |
| JP | 2011-088801 A | 5/2011 |
| JP | 2017-502125 A | 1/2017 |
| KR | 10-1023891 B1 | 3/2011 |
| WO | WO 94/00787 A1 | 1/1994 |
| WO | WO 2009/071135 A1 | 6/2009 |
| WO | WO 2015/086233 A1 | 6/2015 |
| WO | WO 2015/086234 A1 | 6/2015 |
| WO | WO 2015/137518 A1 | 9/2015 |
| WO | WO 2017/057625 A1 | 4/2017 |

* cited by examiner

METHOD FOR PRODUCING A THERMOPLASTIC COMBINATION FILM

CROSS REFERENCE TO RELATED APPLICATIONS

This application is the U.S. National Stage of PCT/EP2018/059805, filed Apr. 18, 2018, which in turn claims priority to European Patent Application No. 17170606.2 filed May 11, 2017, the entire contents of all applications are incorporated herein by reference in their entireties.

The invention relates to a method for producing a thermoplastic combination film suitable for a composite glass pane, a thermoplastic combination film, a composite glass pane, as well as a method for production thereof and use thereof.

Composite glass panes are currently used in many places, in particular in the vehicle sector. Here, the term "vehicle" is broadly construed and relates, among other things, to road vehicles, aircraft, watercraft, agricultural machinery, or even work equipment.

Composite glass panes are also used in other sectors. These include, for example, architectural glazings as well information displays, e.g., in museums or as advertising displays.

A composite glass pane generally has two glass surfaces that are laminated onto an intermediate layer. The glass surfaces can be curved and are usually of constant thickness. The intermediate layer usually comprises a thermoplastic material, usually polyvinyl butyral (PVB), of a predefined thickness, e.g., 0.76 mm.

Since the composite glass pane is generally inclined relative to an observer, double images occur. These double images are caused by the fact that incident light usually does not pass completely through both glass surfaces, but, instead, at least part of the light is first reflected and only passes through the second glass surface after that.

These double images are, in particular, noticeable in the darkness, in particular with strongly radiating light sources such as, for instance, the headlights of an oncoming vehicle.

These double images are extremely distracting. In particular in the field of camera windows, these double images result in misinformation. Camera windows are areas of a pane behind which a camera is installed that displays images from the surroundings. Such camera window are assuming greater importance, for example, in the area of autonomous driving.

Frequently, the composite glass pane is also used as a head-up display (HUD) for displaying information. In that case, an image is projected by means of a projection apparatus onto the composite glass pane to insert data into the field of vision of the observer. In the vehicle sector, the projection apparatus is, for example, arranged on the dashboard such that the projected image is reflected on the nearest glass surface of the composite glass pane inclined in the direction of the observer.

Again, however, part of the light enters the composite glass pane and is then reflected, for example, on the inside boundary layer of the glass surface farther out from point of view of the observer and the intermediate layer and subsequently leaves the composite glass pane with an offset.

Here, as well, a similar effect occurs, the effect of ghost images relative to the image to be displayed.

A purely conventional compensation of ghost images by means of a wedge film with an invariable wedge angle results in the fact that an overcompensation for double images in transmittance is observed. This results in the fact that the respective observer is confused or, in the worst case, receives misinformation. To date, the attempt has been made to solve this problem by no longer arranging the surfaces of the panes parallel to one another, but, instead, at a fixed angle. This is accomplished, for example, in that the intermediate layer has a linearly and/or nonlinearly increasing and/or decreasing thickness. In the vehicle sector, the thickness is typically varied such that the smallest thickness is provided at the lower end of the composite pane toward the engine compartment, whereas the thickness increases in the direction toward the roof, in other words the intermediate layer is wedge-shaped.

Composite glass panes of this type with a wedge-shaped intermediate layer and the optical principles on which they are based are known per se and are described, for example, in the international patent applications WO 2015/086234 A1, WO 2015/086233 A1, and WO 2009/071135 A1, the American patents U.S. Pat. Nos. 8,451,541 B2, 7,060,343 B2, 6,881,472 B2, 6,636,370 B2, and 5,013,134 or the German published patent applications DE 196 11 483 A1 and DE 195 35 053 A1.

The necessary wedge angle progression and the resultant thickness profile of the intermediate layer must be calculated separately for each pane shape. To date, the thickness profile according to the invention is achieved through the use of a corresponding slotted nozzle during extrusion of the film, or by selective stretching of the film heated with an appropriate temperature profile. These methods can also be combined, for example, by producing the thickness profile in one direction using a corresponding slotted nozzle during extrusion and by subsequent corresponding stretching of the film in the other direction.

However, problems occur during this type of production.

When the film webs produced are wound up into rolls for storage and shipping, the rolls assume an increasingly conical shape that results in difficulties in the handling and transport of the rolls. To avoid these problems, it is known from European patent EP 0 647 329 B1 to produce film webs that have a uniform thickness profile on both edges on a width of at least 20% of the full width and a following wedge-shaped thickness profile that extends in each case to the center of the film web.

From the European patent EP 1 063 205 B1, a method for producing an intermediate layer film for composite glass is known, wherein the starting composition for the intermediate layer film is fed to a production system that comprises an extruder, an extrusion die, a first cooling compression roller, and a second cooling compression roller, wherein the two compression rollers have in each case a clear width which is adjusted according to the desired cross-sectional profile of the intermediate layer film to be produced. However, with this method there is the risk that the thermoplastic material will cool too much in the cooling compression rollers, yielding unsatisfactory results.

A further disadvantage of the previously known wedge-shaped, thermoplastic films is that the area of the wedge-shaped profile in the HUD viewing windows is very much larger than is necessary for optimum suppression of the ghost images. In addition, production with two regions with different variations of the wedge angle, as is necessary, for example, for an application in a composite glass pane with an HUD region and a camera window, is very difficult. European patent EP 2 883 693 A1 proposes to cut the section provided for the HUD region out of a film and then to replace it with a region having a wedge-shaped profile. However, no proposals were made for producing the wedge-shaped profile.

The object of the invention is to provide an improved method for producing a thermoplastic film with at least one region with a varying wedge angle.

The object is accomplished according to the invention by a method according to the independent claim 1. Preferred embodiments emerge from the dependent claims.

The invention provides a method for producing a thermoplastic combination film that is suitable for a composite glass pane. The thermoplastic combination film comprises at least one defined area, which is provided for a camera window or an HUD (head-up display) region. This defined area has a variable wedge angle. The thermoplastic combination film is obtained by joining together a first thermoplastic film and a second thermoplastic film. The first thermoplastic film is produced by a prior art method. The second thermoplastic film, which has a variable wedge angle, is obtained by molding on a mold. The three-dimensional shape of second thermoplastic film is predetermined by the mold. As a result of the use of a mold, it is possible to transfer a wedge angle profile calculated in advance using simulation molds precisely to the second thermoplastic film. This is particularly advantageous in the case of more complex wedge angle profiles which cannot be produced as precisely with prior art methods.

The wedge angle is the angle between the surfaces of the film measured at one point.

The thickness of the second thermoplastic film is not constant, but is variable. The wedge angle in the defined area is preferably variable and changes depending on the location. Preferably, the wedge angle changes in two directions extending orthogonally relative to one another (bidirectional wedge). In the case of later use in a windshield, the two directions correspond to the vertical direction (from the roof edge to the engine edge, i.e., from the top to the bottom) and the horizontal direction (from right to left).

With a wedge angle varying in two directions, double images and ghost images can be particularly effectively avoided or reduced. The relationship between wedge angle progressions and the prevention and reduction of ghost images and double images is known in the prior art and is described, for example, in WO2015086234A1 and in WO2015086233A1. Preferably, the optimum wedge angle progression has been optimized in advance using simulation molds for prevention of double images and ghost images.

In a preferred embodiment of the method according to the invention, the joining together of the two films and the production of the second thermoplastic film are done simultaneously. The second thermoplastic film can be injection molded or cast on the first thermoplastic film. As a result, visible transitions between the two films are reduced and material incompatibilities from additional adhesives are avoided.

In a preferred embodiment of the method according to the invention, the step of the molding on a mold is divided into the following steps: First, a polymer melt is obtained, for example, by heating a plastic granulate. This polymer melt is then introduced into the mold. Preferably, the polymer melt is injected through a nozzle into the mold under elevated pressure. This method is known to the person skilled in the art as injection molding. As a preferred alternative, the polymer melt can also be poured into the mold at atmospheric pressure. After the cooling of the polymer melt in the mold, the finished second thermoplastic film is released from the mold. This method is particularly flexible to use in terms of the starting materials since granulates to which a wide variety of additives can be added can be used. Thus, a particularly precise coordination between the material of the first and second thermoplastic film can occur. This results in a reduction of the adverse optical impact in the region where the first and second thermoplastic film abut one another. In particular, in the HUD sector, a visible transition between the first and a second thermoplastic film is extremely distracting.

In another preferred embodiment of the method according to the invention, the step of joining together the first thermoplastic film and the second thermoplastic film comprises at least the steps
Placing the second thermoplastic film on the first thermoplastic film, and
Gluing and/or laser welding and/or cold welding and/or ultrasonic bonding.

This method is particularly flexible to use since the position of the specified area can be easily changed.

In another preferred embodiment of the method according to the invention, the step of joining together the first thermoplastic film and the second thermoplastic film occurs during the production of the composite glass pane. For this, the two films are placed one atop the other and positioned between two glass plates, which are then laminated to form a composite glass pane. As result of the bonding during the lamination operation, particularly good optical results are obtained. Suitable methods for lamination, such as the autoclave method or the vacuum bag method are known to the person skilled in the art.

The first thermoplastic film preferably has a substantially constant thickness. The thickness of the first thermoplastic film is preferably from 50 μm to 2000 μm, particularly preferably 300 μm-850 μm, and typically 380 μm to 760 μm. Thanks to the method according to the invention, these comparatively inexpensive films can be provided with one or a plurality of specified areas in which the wedge angle profiles are adapted as needed. The first thermoplastic film can be formed by one or even by a plurality of superimposed, flat or wedge-shaped, in particular flat, thermoplastic films.

In an alternative embodiment, the first thermoplastic film has a constant wedge angle and thus has a linearly increasing thickness. The production of such films is known and is done, for example, by extrusion through a specially adapted nozzle. Such a film, which is, for example, suitable for reducing ghost images in the patterned region, can be provided, during the course of the method according to the invention with a second thermoplastic film, in a camera window, wherein the wedge angle progression of the second thermoplastic film is optimized for prevention of double images in transmittance.

The first thermoplastic film extends, when used in a composite glass pane, over the entire surface of the pane. The dimensions of the first thermoplastic film are governed by the respective intended use and the size of the subsequent composite glass pane. Preferably, they have a length of 0.25 m to 5 m and a width of 0.25 m to 4 m.

The second thermoplastic film includes at least the specified area, which is provided for a camera window or HUD region. Preferably, the second thermoplastic film substantially extends only over the specified area. The dimensions of the second thermoplastic film are thus smaller than those of the first thermoplastic film.

The thickness of the second thermoplastic film at its thickest point is preferably between 0.10 mm and 0.25 mm and particularly preferably between 0.12 mm and 0.2 mm. Due to this minimal difference in thickness, composite glass panes can be laminated excellently, without critical stresses occurring.

The specified area for an HUD region preferably extends over an area from 10,000 mm² to 200,000 mm². Preferably, in a windshield for a vehicle, the HUD region is arranged on the driver's side.

The HUD region is usually situated on the driver's side in the through-vision region of the composite glass pane. Thanks to the method according to the invention for producing a combination film, a suitable film for right-hand drive vehicles or left-hand drive vehicles can readily be produced by placing a correspondingly optimized second thermoplastic film on the proper side. The term "through-vision region" refers to the region of the pane that is provided for and is suitable for through-vision. The through-vision region of the pane is, in particular, transparent and has no opaque, printed regions, such as the customary peripheral masking screen print in the edge region. In the context of the invention, "transparent" means a pane with transmittance in the visible spectral range >70%.

Preferably, the wedge angle in the defined area initially increases slowly from the bottom upwards in the finished composite glass pane in order to avoid image distortions due to an abrupt increase. Next, in a central region, the wedge angle increases corresponding to a previously optimized profile in order to optimally suppress the creation of ghost images. This is followed by a region in which the wedge angle slowly decreases in order to again make the transition to the first thermoplastic film as little visible as possible. Such a wedge angle progression is suitable for camera windows and HUD regions.

The specified area for a camera window preferably extends over an area of 2000 mm²-10,000 mm². The camera window is preferably arranged, in the case of a windshield for a vehicle, in the vicinity of the roof edge. This region is usually no longer part of the through-vision region. Consequently, in this region visible transitions between a first and a second thermoplastic film are not distracting.

In another preferred embodiment, the thermoplastic combination film includes more than one specified area, preferably two specified areas. In this case, a first specified area is provided as an HUD region and is situated in the through-vision region of the pane and a second specified area is provided as a camera window and is situated in the upper third of the pane. Thanks to the method according to the invention, this can be realized by simply adding suitable second thermoplastic films.

In a preferred embodiment, the indices of refraction of the first thermoplastic film and the second thermoplastic film are the same. Optically, this yields particularly good results. In a preferred embodiment, the first thermoplastic film and the second thermoplastic film include at least one material selected from the group consisting of polyvinyl butyral (PVB), ethylene vinyl acetate (EVA), polyethylene terephthalate (PET), polyurethane (PU), polypropylene (PP), polyacrylate, polyethylene (PE), polycarbonate (PC), polymethyl methacrylate, polyvinyl chloride, polyacetal resins, casting resins, polyacrylates, fluorinated ethylene propylene copolymers, polyvinyl fluoride, ethylene tetrafluoroethylene copolymers as well as copolymers and mixtures. Particularly preferably, the first thermoplastic film is made substantially of PVB. This is particularly suitable as an intermediate layer for composite glass panes and provides good results.

In a preferred embodiment, the first thermoplastic film and the second thermoplastic film are made substantially from the same material. This avoids material incompatibilities and provides particularly good results optically.

In another embodiment of the invention, at least the first thermoplastic film noise-reducing effect. As a result, the transmission of noises through a composite pane provided with the combination film can advantageously be reduced, by which means distraction due to environmental noises and vehicle noises can be reduced. Such an effect can be achieved by a multi-ply, for example, three-ply thermoplastic film, wherein the inner ply has higher plasticity or elasticity than the outer layer surrounding it, for example, as a result of a higher content of plasticizers. Thanks to the the method according to the invention, such a film with a noise-reducing effect can easily be combined with a second thermoplastic film such that a camera window or an HUD region can be integrated.

In in one embodiment of the invention, the thermoplastic combination film can have at least one tinted region. Such a tinted region at the upper edge of the pane is known to the person skilled in the art, for example, as a "shaded band"—it can reduce distraction of the driver from blinding sunlight.

At least the first thermoplastic film can have, in one one embodiment of the invention, a solar or thermal protection function. For example, the thermoplastic film can include a reflective coating in the infrared range or IR absorbing additives.

The invention further proposes a thermoplastic combination film produced according to the method of the invention and a composite glass pane with a thermoplastic combination film according to the invention.

The composite glass pane according to the invention includes at least one first glass pane/glass layer, a second glass pane/glass layer, and a thermoplastic combination film according to the invention, wherein the thermoplastic combination film is arranged between the first glass pane/glass layer and the second glass pane/glass layer. The composite glass pane according to the invention with a locally defined area with a variable wedge angle is particularly stable, since the thickness change in the film is defined only for a comparatively small region. In the case of prior art films with a constant wedge angle, the thickness changes in a vertical and/or horizontal direction over the entire height of the pane and/or with, resulting in the occurrence of stresses. The thickness in such a prior art composite glass pane is greater at the upper end than at the lower end. This difference in thickness also results in optical disadvantages with an installed pane since a thicker pane edge sometimes protrudes at the transition to the roof edge. With the use of a first thermoplastic film with a constant thickness, the thickness of the composite glass pane according to the invention is the same at the upper and lower edge.

The total thickness of the composite glass pane is, in an advantageous embodiment, from 3.5 mm to 6.0 mm, preferably from 4.0 mm to 6.0 mm, particularly preferably from 4.4 mm to 5.6 mm. Composite panes with these thicknesses have adequate mechanical stability and strength and advantageous acoustic properties in terms of shielding against ambient noises. However, they are, on the other hand, not too thick and heavy to be able to be used as a windshield of typical vehicles, in particular motor vehicles.

The outer pane and the inner pane preferably have a constant thickness with substantially plane-parallel primary surfaces and a circumferential side edge connecting them.

The thickness of the inner pane is, in an advantageous embodiment from 0.3 mm to 3.5 mm, preferably from 0.7 mm to 2.6 mm.

The thickness of the outer pane is, in an advantageous embodiment, at least 1.8 mm, preferably at least 2.1 mm. The thickness of the outer pane is preferably at most 4.5 mm, preferably at most 3.5 mm. The thickness of the outer pane is, in a particularly advantageous embodiment, from 2.1 mm to 4.5 mm, for example, from 2.1 mm to 3.5 mm or from 2.5 to 4.5 mm, preferably from 2.5 mm to 3.5 mm. In this range, the composite pane has advantageous mechanical stability and noise shielding properties, but is nevertheless sufficiently thin and light to be able to be used as a windshield.

The outer pane and the inner pane are preferably made of glass, in particular soda lime glass, which is common for windows. The panes can, however, in principle, also be made of other types of glass (for example, borosilicate glass, quartz glass, aluminosilicate glass) or transparent plastics (for example, polymethyl methacrylate or polycarbonate).

The outer pane and the inner panes can, independently of one another, be non-tempered, partially tempered, or tempered. If at least one of the panes is to be tempered, this can be done thermally or chemically.

The invention further proposes a production method for a composite glass pane according to the invention. The production method has at least the following steps:
Providing a first glass layer,
Providing a second glass layer,
Placing a thermoplastic combination film according to the invention on the first glass layer,
Placing a second glass layer on the thermoplastic combination film, and
Bonding the second glass layer to the thermoplastic combination film.

The invention further proposes a head-up display arrangement that comprises at least one projector for illuminating an HUD region of a composite glass pane and a composite glass pane according to the invention with a thermoplastic combination film. The projector is arranged such that, during operation, it substantially illuminates the defined area.

The invention further proposes an arrangement with a camera that has at least one camera and one composite glass pane according to the invention, wherein the camera is aimed at the defined area and records light beams that pass through the composite glass pane.

The invention further proposes the use of a composite glass pane according to the invention as a front window with a head-up display and/or a camera window in means of transportation on water, on land, and in the air.

BRIEF DESCRIPTION OF THE DRAWINGS

Embodiments of the present invention are described by way of example with reference to the appended drawings, which depict:

FIG. 1 depicts the basic context of the development of double images in transmittance with reference to a beam image. A curved pane 1 is assumed. The curved pane has, at the point of entry of a beam into the curved glass pane 1 a radius of curvature (R+D). Light is now emitted from a light source 3. This light strikes the pane and is refracted in accordance with the known refraction laws at the transition from air to glass on the first boundary surface and from glass to air on the second boundary surface and reaches the eye 2 of an observer. This beam is depicted as a solid line P. From the perspective of the observer, the light source 3 appears to be situated at the location 3'. This is depicted as beam P'. In addition to this beam P referred to as the primary beam, the beam is, however, only partially refracted on the second gas/air boundary surface in the manner described above; a smaller fraction is reflected on the second boundary surface and is once again reflected on the first boundary surface before the beam now passes through the second boundary surface and reaches the eye 2 of the observer. This beam, the so-called "secondary beam" is depicted as a dashed line S. From the perspective of the observer, the light source 3 also appears to be situated at the location 3". The angle n enclosed by the primary beam P' and the secondary beam S is the so-called "double image angle".

Figure 1:
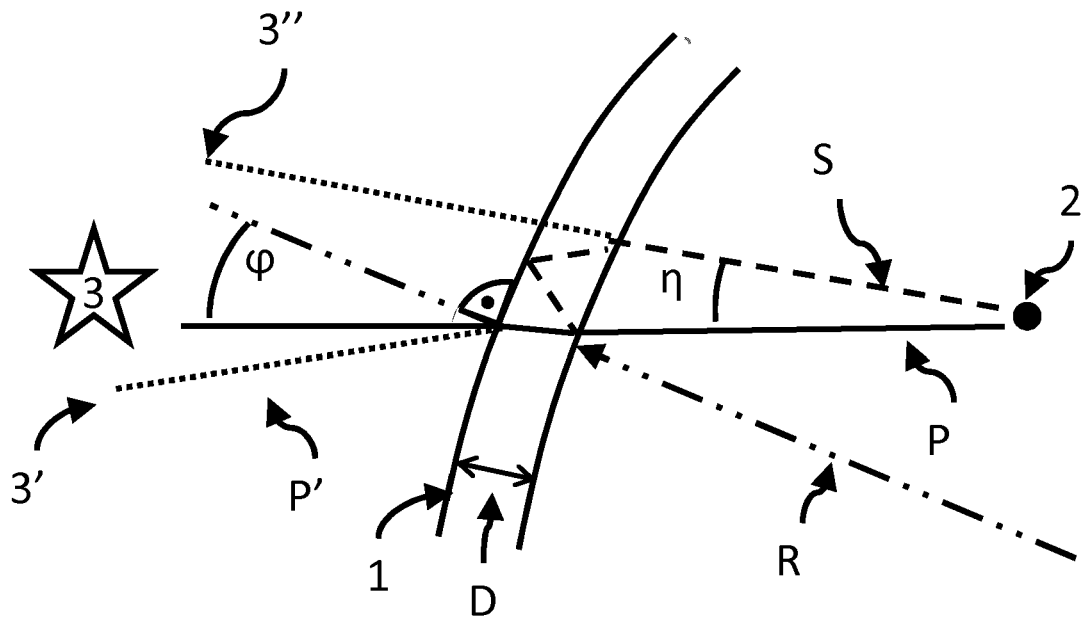
FIG. 1 the basic context of the development of double images in transmittance.

In order to address this double image, provision can now be made to provide a wedge angle between the two boundary layers assumed to be substantially parallel in FIG. 1.

According to J. P. Aclocque "Doppelbilder als störender optischer Fehler der Windschutzscheibe" [Double Images As Interfering Optical Errors in Windshields]" in Z. Glastechn. Ber. 193 (1970) pp. 193-198, the double image angle can be calculated as a function of the radius of curvature of the glass pane and the angle of incidence of the light beam according to the following equation:

$$\eta = \frac{2d}{R} \cdot \frac{\sin\varphi}{\sqrt{n^2 - \sin^2\varphi}},$$

where
η is the double image angle, n is the index of refraction of the glass, d is the thickness of the glass pane,
R is the radius of curvature of the glass pane at the location of the incident light beam, and φ is the angle of incidence of the light beam relative to the perpendicular on the tangent to the pane.

In the case of flat glass panes, the double image angle η is, according to the following formula $$\eta = 2 \cdot \delta \cdot \frac{\sqrt{n^2 - \sin^2\varphi}}{\cos\varphi}$$

a function of the wedge angle δ formed by the glass surfaces.

Thus, by setting the aforementioned formulas equal, the wedge angle necessary for the elimination of the double image can be calculated:

$$\delta = \frac{d}{R} \cdot \frac{\cos\varphi \cdot \sin\varphi}{n^2 - \sin^2\phi}.$$

Figure 3:
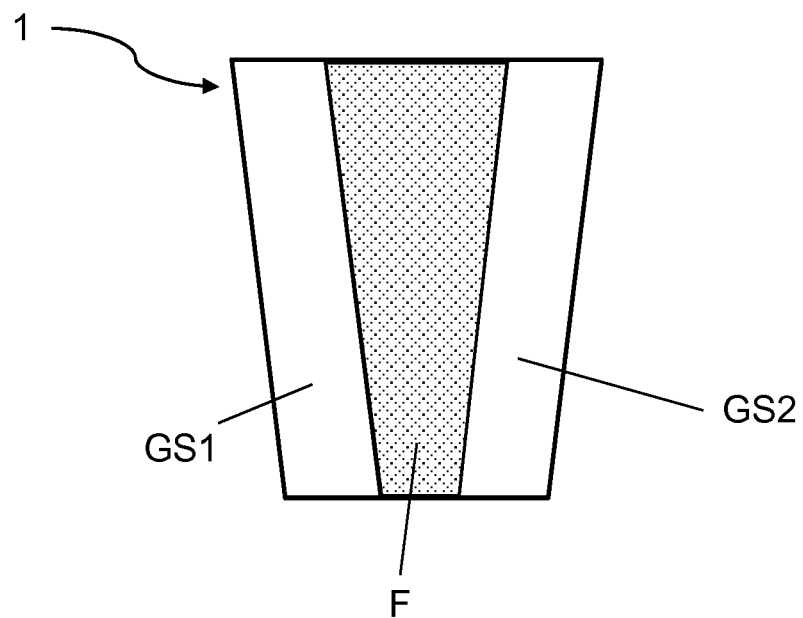
FIG. 3 an exemplary structure of a composite glass pane with a wedge-shaped intermediate layer, FIG. 4 a cross-section through a region of a thermoplastic combination film according to the invention, FIG. 5 a plan view of a composite glass pane according to the invention with a camera window, FIG. 6 the basic structure of a camera arrangement, FIG. 7 a plan view of a composite glass pane according to the invention with an HUD region, and FIG. 8 a schematic representation of a method according to the invention.

Usually, this wedge angle is realized in that in composite glass panes 1 a wedge-shaped intermediate layer F is placed between a first glass layer $GS_1$ and a second glass layer $GS_2$, see FIG. 3. It can usually be assumed for the sake of simplicity that the index of refraction n is constant, since the difference in the index of refraction of the intermediate layer F and the glass panes $GS_1$, $GS_2$ is rather small such that there is hardly any effect due to the small difference.

This idea can be also applied with curved windshields. Usually, for the sake of simplicity, the angle of incidence and the radius of curvature are assumed for a reference eye point, and the wedge angle determined therewith is used for the entire windshield.

In the case of large composite glass panes 1, so-called "panorama panes", and/or more highly curved composite glass panes 1, this approach is, however, no longer adequate such that here, usually, a wedge-angle progression variable in the vertical direction must be determined.

Then, it is possible, for example, by pointwise calculation along an imaginary vertical center line of a composite glass pane and possible interpolation, to determine a compensation wedge-angle profile δ. After determination of the compensation wedge angle profile, a corresponding intermediate layer F can be produced.

With regard to head-up displays, a problem develops which is similar to the phenomenon of double images and is referred to as a ghost image.

Figure 2:
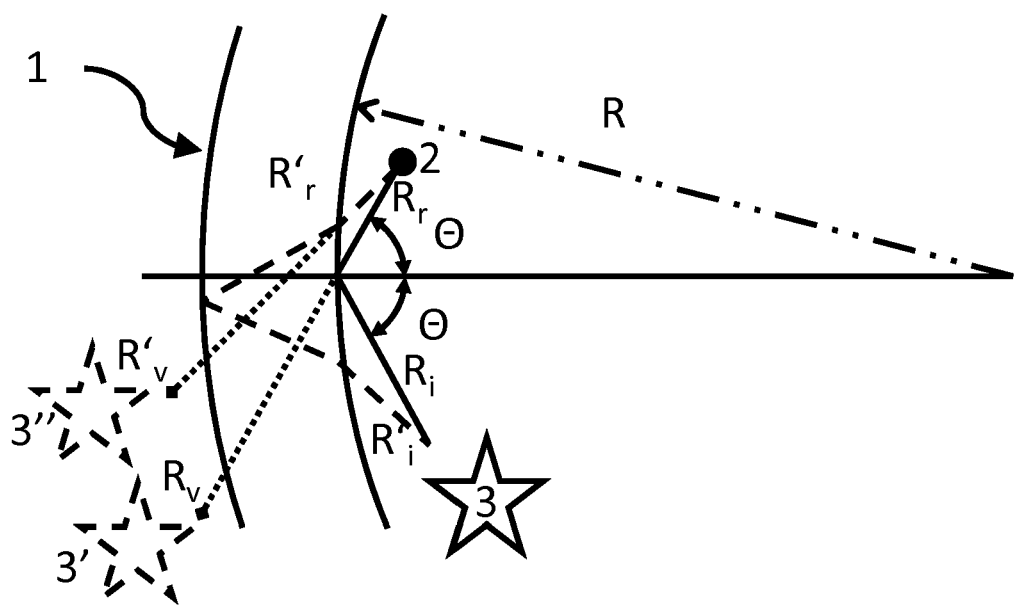
FIG. 2 the basic context of the development of ghost images in reflection.

FIG. 2 presents the basic context of the development of ghost images in reflection with reference to a beam image. Here, a curved glass pane 1 is assumed. The curved glass pane 1 has a radius of curvature R at the point of entry of a beam into the curved glass pane 1. Light is now emitted from a light source 3, which is representative of a head-up display HUD. This light impinges on the glass pane 1 along the beam $R_i$ from the inside at an angle Θ and is reflected there at the same angle Θ. The reflected beam $R_r$ reaches the eye 2 of an observer. This beam path is depicted as a solid line. From the perspective of the observer, the light source 3 appears to be situated virtually at the location 3', i.e., in front of the glass pane 1. This is depicted as beam $R_v$. In addition to this first beam, another beam reaches the eye 2 of the observer. This beam $R'_i$ likewise originates from the light source 3. However, this beam $R'_i$ penetrates, in accordance to the known laws of refraction, into the glass pane 1 on the inner air/glass boundary surface and is reflected on the outer glass/air boundary surface before the beam passes through the inner boundary surface and reaches the eye 2 of the observer as beam $R'_r$. The term "inner boundary surface" thus refers to the boundary surface that is situated closer to the observer, whereas the term "outer boundary surface" refers to the boundary surface that is farther away from the observer. This beam path is depicted as a dashed line. From the perspective of the observer, the light source 3 appears to be situated virtually at the location 3", i.e., likewise in front of the glass pane 1. This is depicted as beam $R'_v$.

To address this problem, the wedge angle can now be altered such that the beam $R'_r$ reflected on the outer boundary surface and the beam $R_r$ reflected on the inner boundary surface overlap relative to the eye 2 of the observer, i.e., the beam reflected on the outer boundary surface exits at the point of reflection of the beam impinging on the inner boundary surface.

However, if this is done only for a single eye position, the wedge angle determined therefrom can yield non-optimum results. This can be explained, among other things, by the fact that both the body sizes of drivers for whom the HUD displays are primarily intended and the seating position are very different such that there are a large number of possible eye position. This results in the fact that the virtual display is situated in different places depending on the eye position; and, accordingly, there is, for each of these eye positions, a sometimes different value for an optimized wedge angle. In addition, a wedge angle optimized exclusively for ghost images usually results in an overcompensation of double images such that the double images thus caused are again problematic relative to the perception of the observer and/or compliance with regulatory test specifications and/or compliance with customer specifications relative to double images.

Wedge angle profiles that take into account both the different eye positions, i.e., also the compensation of double images in the HUD region are not constant in either the horizontal or the vertical direction. The resultant thickness profiles for the intermediate layer F cannot be produced by simple extrusion processes.

Figure 4:
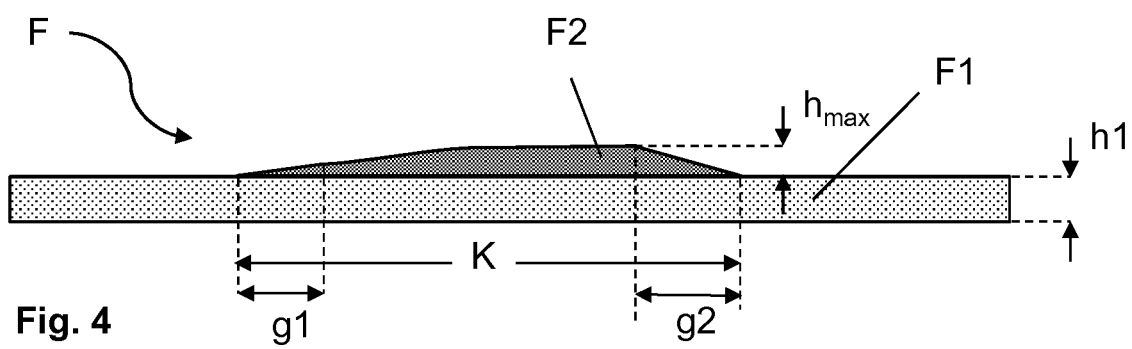

FIG. 4 depicts a region of a thermoplastic combination film F according to the invention in cross-section. The combination film F is made up of two parts: the first thermoplastic film F1 and the second film F2. The first thermoplastic film is made, in the example, of PVB with a constant thickness h1 of 0.76 mm and the second film F2 is also made of PVB; however, the thickness varies within the specified area K, wherein the maximum thickness, $h_{max}$ of the second thermoplastic film is 0.18 mm. The value $h_{max}$ is measured at the point at which the second thermoplastic film F2 is the thickest. In the defined area, the wedge angle initially increases slowly in the first border region g1; and, then, in a central region increases according to a previously optimized profile. Following that, the wedge angle decreases slowly again in a second border region g2 in order to make the transition to the first thermoplastic film F1 as little visible as possible. This arrangement with two border regions with a slowly increasing or decreasing wedge angle above and below or to the right and the left relative to an installed window pane is particularly advantageous for minimizing the adverse optical impact at the transition from the first thermoplastic film to the second thermoplastic film.

Figure 5:
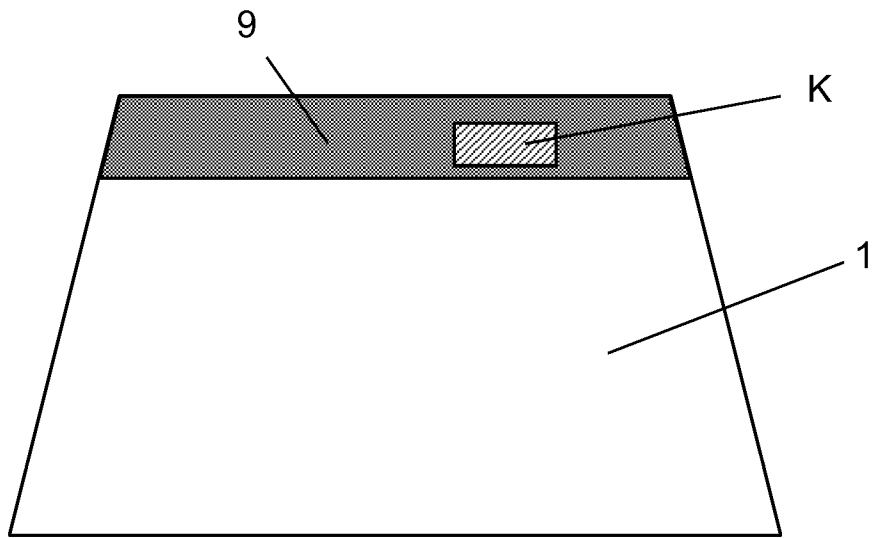

FIG. 5 depicts a plan view of a composite glass pane according to the invention 1. The composite glass pane is provided as a windshield of a passenger car. The upper edge in the figure borders the roof edge in the vehicle, and the lower edge borders the engine edge. A camera window K is arranged in the upper third of the composite glass pane outside the through-vision area. The windshield preferably has, in the upper edge region, a masking print 9. Masking prints are common for vehicle panes outside the central field of vision to conceal attachment parts or to protect the adhesive with which the vehicle pane is connected to the car body against UV radiation. The masking print typically consists of a black or dark enamel applied and fired in a screen printing process. In the example, the masking print 9 frames the camera window K of the vehicle pane circumferentially to conceal the camera positioned therebehind. The composite glass pane consists of two glass layers, GS1 and GS2, and a thermoplastic combination film F, which is arranged between these glass layers. The glass layers GS1 and GS2 are made of soda lime glass and have a thickness of 2.1 mm. The thermoplastic combination film F is formed as described in FIG. 4. The specified area K forms the camera window.

Figure 6:
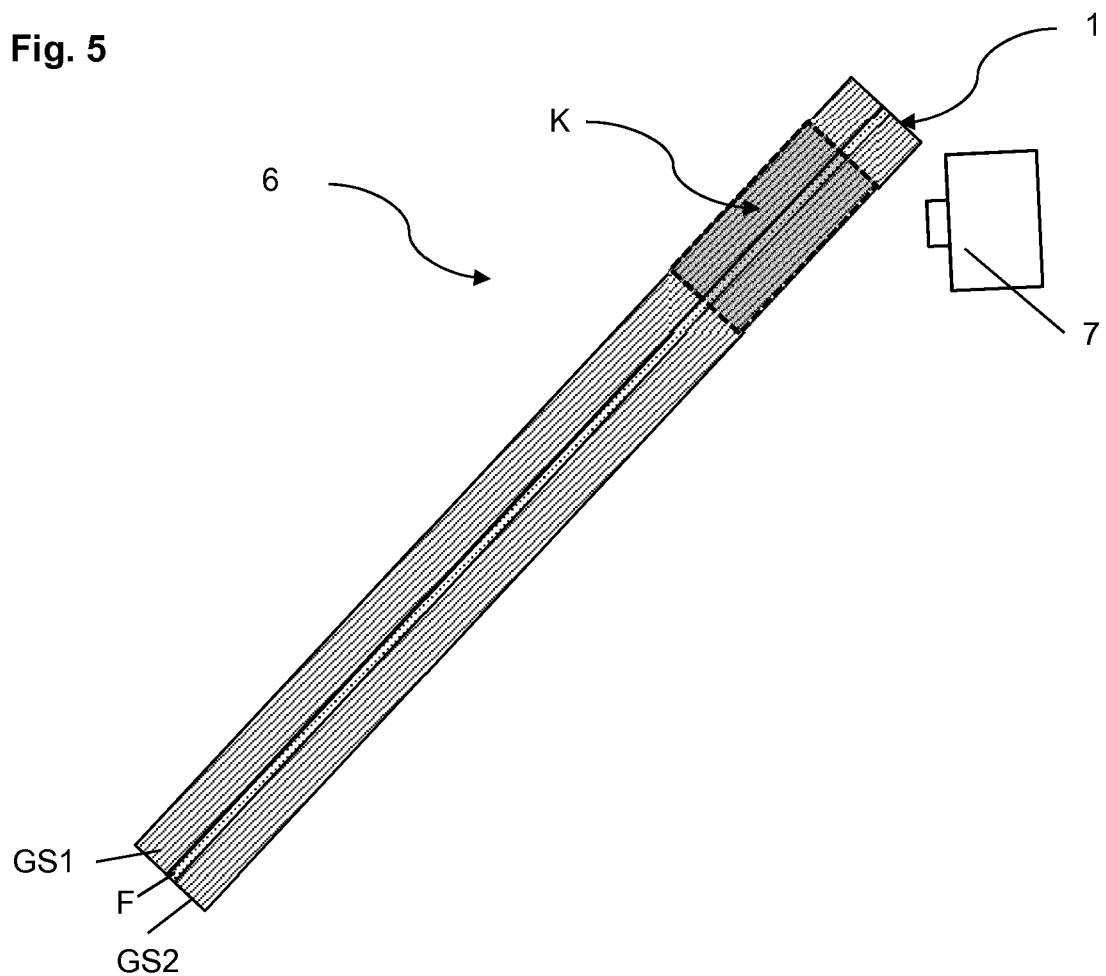

FIG. 6 depicts a possible camera arrangement 6 consisting of the composite glass pane 1 described and camera 7. The glass layer GS1 of the composite glass pane 1 is directed toward the outside of the vehicle and the glass layer GS2 toward the inside. The camera 7 is arranged in the interior of the vehicle and records the light beams that pass through the composite glass pane 1 from the outside inward. The camera is aimed at the defined area; this means that it is mounted such that the light beams pass through the region with the optimized wedge angle profile. Thus, the double images in transmittance are efficiently reduced. This can, for example, be used successfully in the area of lane assistance systems.

Figure 7:
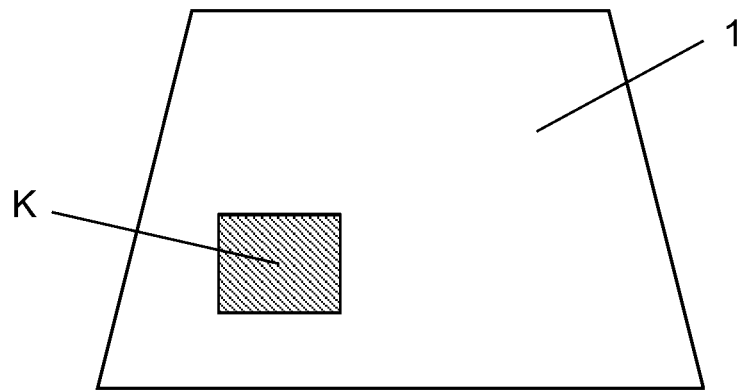

FIG. 7 depicts a plan view of a composite glass pane according to the invention 1 with an HUD region. The HUD region is situated in the defined area in which an optimized wedge angle profile is arranged for preventing ghost images and double images. The HUD region is situated, in the example depicted, on the left side of the windshield in the through-vision region. During production of the composite glass pane 1 from a glass layer GS1, a glass layer GS2, and a thermoplastic combination film F according to the invention, this design can be readily adapted for a right-hand drive vehicle, by placing a second thermoplastic film F2 with an optimized wedge angle profile on the right side.

Figure 8:
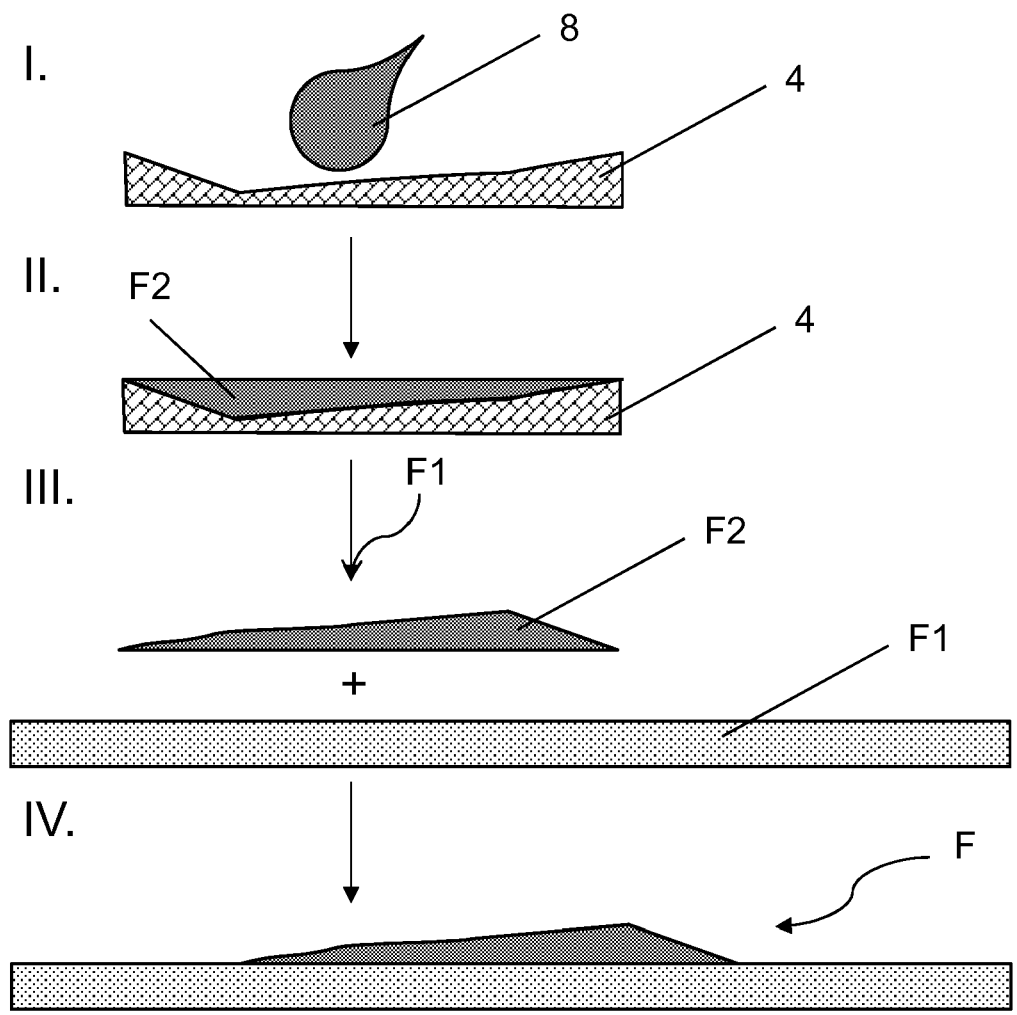

FIG. 8 depicts, by way of example, a method cycle according to the invention. There in step I, a polymer melt 8 is obtained. In an injection molding operation, the polymer granulated is, for example, heated in a screw extruder under elevated pressure; and then the polymer melt obtained is injected under elevated pressure through a nozzle into the mold 4. Alternatively, the polymer melt 8 is introduced into the mold 4 at atmospheric pressure. The polymer melt 8 solidifies in the mold 4 and assumes the shape of the mold 4 (step II) such that the second thermoplastic film F2 can be released 4 in step III. The mold 4 is preferably coated with Teflon to facilitate the release of the thin second thermoplastic film F2. The first thermoplastic film F1 with a constant thickness is provided. The second thermoplastic film F2 is placed on the first thermoplastic film F1 and welded to the first thermoplastic film F1.

LIST OF REFERENCE CHARACTERS

GS1 glass layer 1, first glass layer, first glass pane
GS2 glass layer 2, second glass layer, second glass pane
F thermoplastic combination film, wedge-shaped intermediate layer,
K defined area
F1 first thermoplastic film
F2 second thermoplastic film
g1 first border region
g2 second border region
h1 thickness of the first thermoplastic film
$h_{max}$ maximum thickness of the second thermoplastic film
1 glass pane
2 eye
3 light source, HUD projector
4 mold
5 HUD arrangement
6 camera arrangement
7 camera
8 polymer melt
9 masking print

The invention claimed is:

1. Method for producing a thermoplastic combination film suitable for a composite glass pane, wherein the thermoplastic combination film comprises at least one defined area, which is provided for a camera window or an HUD (head-up display) region that has a variable wedge angle, the method comprising:
providing a first thermoplastic film,
producing a second thermoplastic film with a variable wedge angle, wherein a three-dimensional shape of the second thermoplastic film is obtained by molding on a mold, and
joining together the first thermoplastic film and the second thermoplastic film.

2. The method according to claim 1, wherein the molding on a mold comprises:
obtaining a polymer melt,
introducing the polymer melt into the mold,
releasing the second thermoplastic film from the mold.

3. The method according to claim 1, wherein joining together the first thermoplastic film and the second thermoplastic film and producing the second thermoplastic film are done simultaneously.

4. The method according to claim 1, wherein joining together the first thermoplastic film and the second thermoplastic film comprises
placing the second thermoplastic film on the first thermoplastic film, and
gluing and/or laser welding and/or cold welding and/or ultrasonic bonding.

5. The method according to claim 1, wherein the first thermoplastic film has a constant thickness.

6. The method according to claim 1, wherein the first thermoplastic film and the second thermoplastic film contain at least one material selected from the group consisting of polyvinyl butyral, ethylene vinyl acetate, polyethylene terephthalate, polyurethane, polypropylene, polyacrylate, polyethylene, polycarbonate, polymethyl methacrylate, polyvinyl chloride, polyacetal resins, casting resins, polyacrylates, fluorinated ethylene propylene copolymers, polyvinyl fluoride, ethylene tetrafluoroethylene copolymers, and copolymers and mixtures thereof.

7. The method according to claim 6, wherein the first thermoplastic film is made substantially of PVB.

8. Head-up display arrangement, comprising a projector for illuminating a head-up display area of a composite glass pane and a composite glass pane equipped with a thermoplastic combination film obtained according to a method of claim 1, wherein, during operation, the projector substantially illuminates the defined area.

9. Camera arrangement, comprising a camera and a composite glass pane at least comprising a first glass layer, a second glass layer, and a thermoplastic combination film obtained according to a method of claim 1, wherein the thermoplastic combination film is arranged between the first glass layer and the second glass layer and wherein the camera is directed at the defined area and records light beams that pass through the composite glass pane.

* * * * *